United States Patent [19]

Ogawa

[11] Patent Number: 5,296,981
[45] Date of Patent: Mar. 22, 1994

[54] DISK DRIVE APPARATUS

[75] Inventor: Tokumon Ogawa, Komagane, Japan

[73] Assignee: Nagano Nidec Corporation, Nagano, Japan

[21] Appl. No.: 921,306

[22] Filed: Jul. 28, 1992

[30] Foreign Application Priority Data

Jul. 31, 1991 [JP] Japan ................................. 3-216142
Sep. 2, 1991 [JP] Japan ................................. 3-250487

[51] Int. Cl.$^5$ ............................................. G11B 7/02
[52] U.S. Cl. ................................. 360/99.08; 360/106
[58] Field of Search ............... 360/98.07, 99.04, 99.08, 360/106

[56] References Cited

U.S. PATENT DOCUMENTS

| | | | |
|---|---|---|---|
| 4,359,763 | 11/1982 | Hoffman | 360/99 |
| 4,620,301 | 10/1986 | Koide | 360/99.08 |
| 4,686,592 | 8/1987 | Carroll et al. | 360/98.07 |
| 4,864,443 | 9/1989 | Peterson | 360/99.12 |
| 4,881,140 | 11/1989 | Ghose et al. | 360/99.08 |
| 5,025,335 | 6/1991 | Stefansky | 360/97.01 |

Primary Examiner—Robert S. Tupper
Attorney, Agent, or Firm—McCormick, Paulding & Huber

[57] ABSTRACT

A disk drive apparatus includes a magnetic disk, a spindle motor for rotating the magnetic disk, a magnetic head for writing data on and/or reading out data from the magnetic disk, a support arm for supporting the magnetic head, and a voice coil motor for pivoting the support arm. The spindle motor has a hub on which the magnetic disk is mounted, a rotor magnet mounted on the hub, and a stator disposed opposite to the rotor magnet. The stator includes a stator core around which an armature coil is wound. Teeth portions of the stator core are disposed substantially equiangularly in a circumferential direction while at least part of a plurality of coil winding portions are disposed non-uniformly in the circumferential direction, whereby the armature coils wound around the plurality of coil winding portions are retracted from a path in which the support arm is moved.

8 Claims, 5 Drawing Sheets

DISK DRIVE APPARATUS

FIELD OF THE INVENTION

The present invention relates to a disk drive apparatus for rotating a disk, such as a magnetic disk.

DESCRIPTION OF THE RELATED ART

A conventional hard disk drive apparatus includes a hard disk which is a recording medium, a spindle motor for rotating the hard disk mounted thereon, a head for writing data on or reading data from the hard disk, and an arm for movably supporting the head. A single or a plurality of hard disks are mounted on a hub for retaining the hard disk in the spindle motor. The number of hard disks mounted on the hub is determined by the capacity of data. In recent years, portable notebook type hard disk drive-built in personal computers have been put into market. In such notebook type personal computers, a further reduction in the size or thickness of the disk drive has been desired.

However, in the reduction in the size or thickness of the disk drive, reduction in the size of the spindle motor which requires a relatively large space is not easy. Excessive reduction in the size thereof may make it impossible for a required rotational force to be obtained.

Furthermore, in the conventional hard disk drive apparatus, when a required number of hard disks are mounted on the hub of the spindle motor, they are fixedly retained by an annular clamping member provided therebetween. In that case, the hard disks are fixed to the hub by fixing the clamping member by means of screws threaded into a plurality of threaded holes provided on a fixed circumference.

However, since the threaded holes extend in the direction of the rotary axis of the hub, the bearing member of the spindle motor may be damaged due to the force applied during fixing of the clamping member in the direction of the rotary axis thereof. Furthermore, when the clamping member is fixed with an imbalanced or non-uniform tightening force, an imbalanced force may act to the bearing member, generating non-repetitious deflections (NRRO) or vibrations thereof.

SUMMARY OF THE INVENTION

A primary object of the present invention is to provide a disk drive apparatus which can meet the requirement of further reduction in the size of the apparatus.

A second object of the present invention is to provide a disk drive apparatus which enables an amount of force which acts when a clamping means is mounted in the direction of a rotary axis thereof to be reduced.

Other objects and features of the present invention will become apparent from the following description taken in connection with the accompanying drawings.

DETAILED DESCRIPTION OF THE PREFERRED EMBODIMENTS

Embodiments of the present invention will now be described with reference to the accompanying drawings First, a first embodiment of a disk driving apparatus according to the present invention will be described below with reference to FIGS. 1 and 2.

Figure 1:
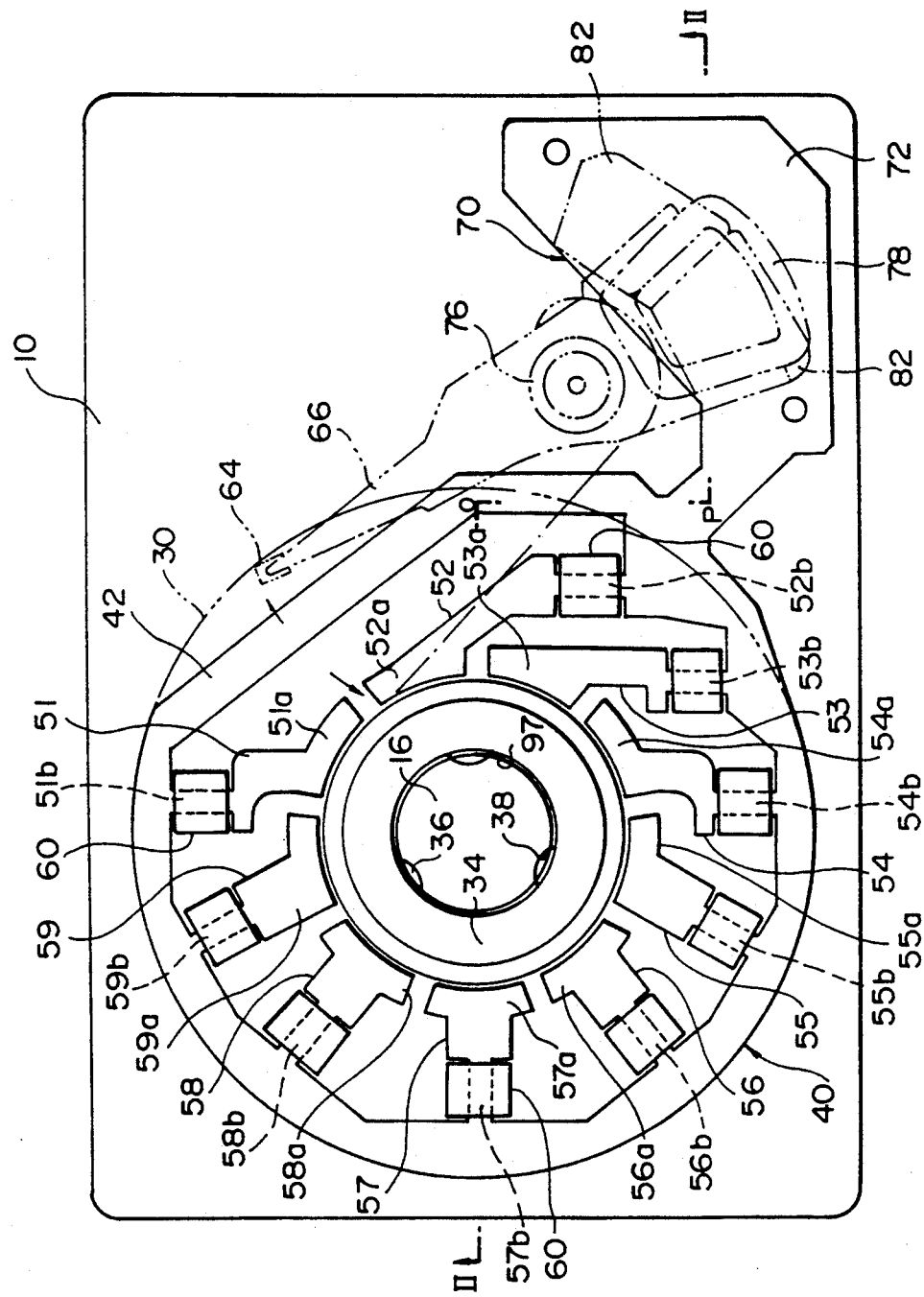
FIG. 1 is a plan view of a first embodiment of a disk drive apparatus according to the present invention.
Figure 2:
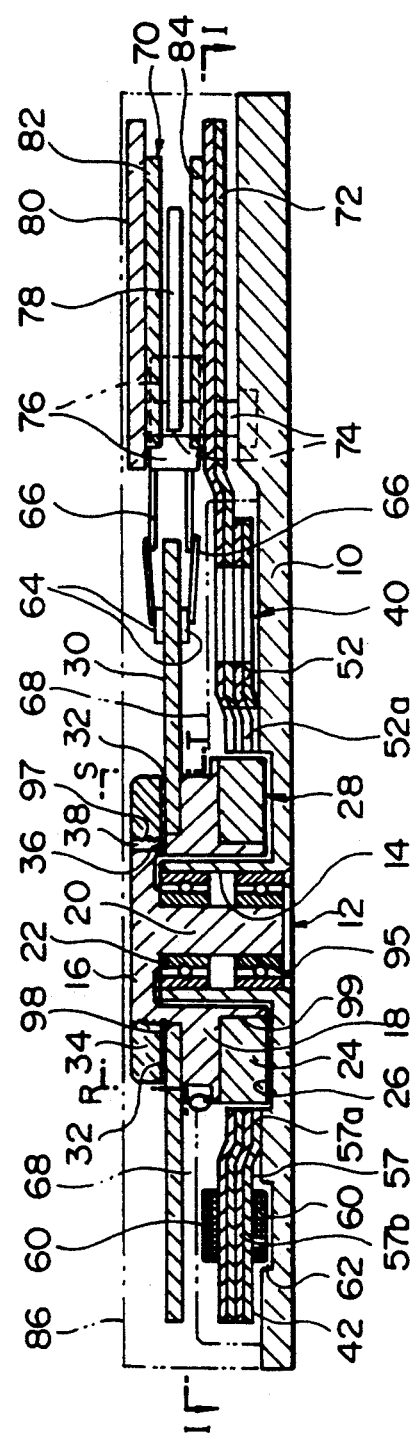
FIG. 2 is a section taken along the line II—II of FIG. 1.

FIGS. 1 and 2 are respectively plan and cross-sectional views of a disk drive apparatus according to the present invention. FIG. 1 is a plan view as seen when looking in the direction of the line I-Q-R-S-T-I. FIG. 2 is a section taken along the line II-O-P-II of FIG. 1.

The disk drive apparatus of FIGS. 1 and 2 has a housing 10. A cylindrical bearing housing 14 for a spindle motor 12 for driving a disk is formed integrally with the housing 10 shown in FIG. 1 at a position located slightly to the left of the central portion thereof. A magnetic disk serving as a recording member is loaded on a hub 16. The hub 16 has substantially a cup-like shape. A rotary shaft 20 is formed integrally with and coaxially with respect to the hub 16 at the central portion located on the inner side of a peripheral wall 18 of the hub 16. The rotary shaft 20 is rotatably supported through two ball bearings 22 and 95 mounted on the inner side of the bearing housing 14. In this embodiment, since the bearing housing 14 is formed integrally with the housing 10, as compared with the case in which the bearing housing provided separately from the housing 10 is mounted on the housing 10, the number of parts is reduced, and the size and thickness of the disk drive apparatus can be reduced.

The peripheral wall 18 of the hub 16 is located around the bearing housing 14. An annular rotor magnet 24 is disposed on an outer side 99 of an open portion (a lower end portion as viewed in FIG. 2) of the peripheral wall 18. The rotor magnet 24 consists of a predetermined number of N and S poles which are disposed alternately in the circumferential direction thereof. A rotor 29 is mainly composed of the rotor magnet 24 and the hub 16. The rotor magnet 24 is disposed on the inner side of a stator core 40, which will be described below in detail, in the radial direction in such a manner that it opposes inner peripheral portions (51a through 59a) of the stator core 40. Both the rotor magnet 24 and the lower end portion of the peripheral wall 18 are accommodated in an annular recess 26 provided on the outer peripheral portion of the proximal end portion of the bearing housing 14 in the housing 10 in such a manner that they are slightly separated from the housing 10. Thus, the thickness of the rotor magnet 24 is cancelled by the depth of the recess 26. In other words, the vertical dimension of the disk drive apparatus as viewed in FIG. 2, i.e., the height (thickness) of the entire apparatus, can be substantially reduced. Both a combination of the rotor magnet 24 and the annular recess 26 and a combination of the outer side of the bearing housing 14 and the inner side of the peripheral wall 18 form a labyrinth sealing structure. Therefore, leakage of the fine oil particles or dirt from the ball bearing 22 or the like into, for example, the disk chamber can be prevented.

A magnetic disk 30 on which data is recorded is mounted on a proximal end portion 98 (whose upper surface acts as the disk mounting surface) of the peripheral wall 18 of the hub 16. A coned disk spring-shaped washer 32 is mounted on the proximal end portion 98 of the peripheral wall 18 of the hub 16 and is positioned at the edge portion of a hole in the upper surface of the disk 30. The disk 30 is fixed by an annular clamping member 34 through the washer 32. The inner peripheral portion of the clamping member 34 is internally threaded. The clamping member 34 is thus threadedly engaged with an externally threaded portion 97 on the peripheral wall 18 of the hub 16.

The stator core 40 is fixed to the housing 10. The stator core 40 has an annular proximal end portion 42 at the outer peripheral portion thereof. The annular proximal end portion 42 extends over the entire periphery of the stator core 40. The stator core 40 also has nine stator teeth 51 through 59 on the inner peripheral side of the proximal end portion 42. The nine stator teeth 51 through 49 are directed inwardly in the radial direction of the stator core 40. The inner peripheral portions of the stator teeth 51 through 59, i.e., teeth portions 51a through 59a, are located on the outer side of the rotor magnet 24 in the radial direction thereof in such a manner that they oppose the rotor magnet 24 in the radial direction.

In order to dispose the teeth portions 51a through 59a of the stator teeth 51 through 59 in an opposed relation to the rotor magnet 24, they are fixed to the upper surface of the housing 10 and are brought into coincidence to the magnetic centers of the rotor magnet 24. The portions of the stator teeth 51 through 59 located slightly on the outer side of the teeth portions 51a through 59a in the radial direction are curved in an upward direction (as viewed in FIG. 2). The height of the curved portions is the same as that of the annular proximal end portion 42. That is, while only the teeth portions 51a through 59a of the stator teeth 51 through 59 are fixed to the housing 10, the remaining portion of the stator core 40 is separated from the housing 10 by a predetermined gap.

In the stator core 40, the proximal end portions of the stator teeth 51 through 59 form narrow coil winding portions 51b through 59b around which a stator coil 60 is wound. A coil accommodating recessed portion 62 is provided at the portion of the housing 10 which corresponds to the portion of each of the stator teeth where the stator coil 60 is provided, whereby the height of the disk drive apparatus can be substantially reduced, as in the case of the annular recess 26.

The teeth portions 51a through 59a of the stator teeth 51 through 59 are disposed substantially at the same intervals in the circumferential direction thereof. The circumferential length of the teeth portions 51a through 59a is substantially the same, that is, about 33 degrees in the central angle from the rotary axis of the spindle motor 12. The coil winding portions 51b through 59b are disposed over the entire circumference except for the movable range of a magnetic head 64 and a support arm for supporting the magnetic head 64, which will be described in detail later, i.e., are disposed to the left as viewed in FIG. 1. No stator coil 60 exists between the stator core 40 and the hard disk 30 over the movable range of the magnetic head 64 and support arm 66, and this forms a space between the stator core 40 and the hard disk 30 into which the magnetic head 64 and the support arm 66 can be moved. The aforementioned structure of the teeth portions 51a through 59a of the stator teeth 51 through 59 assures substantially the same magnetic relationship between the rotor magnet 24 and the stator core 50 as that obtained when the coil winding portions 51b through 55b and 59b are not provided to the left.

The offset of the coil winding portions in the circumferential direction will be given in terms of the angular offset of the coil winding portions with respect to the corresponding stator teeth portions. Angles hereinafter referred to are the angles of the central position of the coil winding portion and stator tooth portion as seen from the rotary axis of the spindle motor 12 unless otherwise stated. The teeth portions 56a through 58a of the stator teeth 56 through 58 and the coil winding portions 56b through 58b are respectively located at the same position in the radial direction, and there is substantially no offset between them. The coil winding portion 52b of the stator tooth 52 is offset clockwise by about 43 degrees as viewed in FIG. 1 with respect to the tooth portion 52a. The coil winding portion 51b of the stator tooth 51 is offset counterclockwise by about 23 degrees with respect to the tooth portion 51a. The coil winding portion 53b of the stator tooth 53 is offset clockwise by about 33 degrees with respect to the tooth portion 53a. The coil winding portion 54b of the stator tooth 54 is offset clockwise by about 24 degrees with respect to the tooth portion 54a. The coil winding portion 55b of the stator tooth 55 is offset clockwise by about 10 degrees with respect to the tooth portion 55a. The coil winding portion 59b of the stator tooth 59 is offset counterclockwise by about 10 degrees with respect to the tooth portion 59a.

The aforementioned disk drive apparatus has the following features. Since the stator core 40 is provided on the outer side (on the outer side in the radial direction of the hub 16) of the hub 16 to which the magnetic disk 30 is fixed, the magnetic heads 64 and the support arms 66 move between the stator core 40 and the disk 30. However, since the coil winding portions of part of the stator teeth of the stator core 40 are disposed nonuniformly substantially in the circumferential direction, the armature coil 60 retracts from the movement path of the support arms 66, and no stator coil 60 is thus present between the stator core 40 and the disk 30 over a predetermined range. Since no stator coil 60 exists between the stator core 40 and the disk 40, the height of the drive disk apparatus can be reduced in an amount corresponding to the winding thickness of the stator coil 60. Consequently, the thickness or size of the disk drive apparatus can be reduced without reducing a magnetic space required for the rotor magnet 24 or stator core 40, and a highly effective hard disk drive apparatus can be obtained.

A member 68 shown in FIG. 2 is a magnet shielding member formed of a ferromagnetic substance, such as electro-magnetic steel plate. The magnetic shielding member 68 is provided over the stator core 40 as if it separates the stator core 40 from the disk 30 so as to prevent the disk 30 from being affected by the leakage flux generated from the stator core 40 or rotor magnet 24. A member 86 is a lid member for sealing the disk chamber.

As shown in FIG. 2, the stator core 40 consists of a predetermined number of electro-magnetic steel plates (four plates in FIG. 2) which are laid on top of another.

In the pile of electro-magnetic steel plates, the upper half thereof as viewed in FIG. 2 has an extending portion 72 which is bent in an upward direction and extends to the right. The extending portion 72 of the stator core 40 functions as a lower yoke of a voice coil motor 70 for driving the magnetic heads. Since the stator core 40 of the spindle motor 12 for driving the disk and the yoke of the voice coil motor 70 for driving the magnetic heads are formed as one unit, the positioning of the voice coil motor 70 to the spindle motor 12 can be made more reliable.

A member 74 is a pole mounted on the housing 10. A member 76 is a rotary sleeve member rotatably supported by the pole 74 through a ball bearing (not shown). Each of the support arms 66 protrudes from the rotary sleeve member 76 outwardly in the radial direction thereof. The magnetic head 64 is supported on the distal end of the support arm 66. A movable coil 78 is fixed to an end of the rotary sleeve 76 which is remote from the support arm 66. An upper yoke 80 is fixed to the upper surface of the pole 74. A pair of substantially fan-shaped permanent magnet plates 82 and 84 are fixed to the undersurface of the upper yoke 80 and the upper surface of the lower yoke 72, respectively. The movable coil 78 is located between the upper and lower permanent magnet plates 82 and 84. Excitation of the movable coil 78 and pivot thereof about the rotary axis of the rotary sleeve member 76 drive the magnet heads 64 in the directions indicated by the arrows in FIG. 1 and thus move them along the upper and lower surfaces of the disk 30 shown in FIG. 2. As mentioned above, since there is no stator coil 60 between the stator core 40 and the disk 30 over the movable range of the magnetic heads 64 and the support arms 66, the height of the hard disk drive apparatus can be reduced. The housing 10 also serves as the frame of the spindle motor 12. The annular recess 26 and coil accommodating recessed portion 62 in the housing 10 accommodate the corresponding members, whereby the housing 10 is made sufficiently strong and rigid. Consequently, the height of the disk drive apparatus can be substantially reduced.

Figure 3:
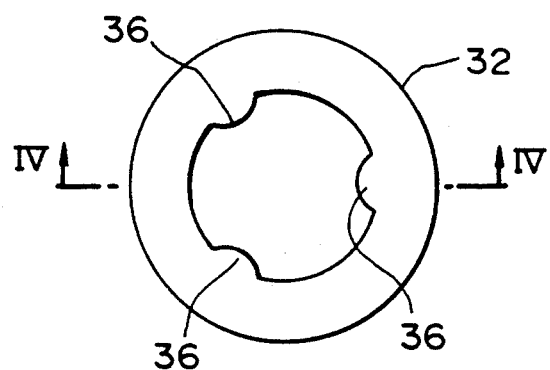
FIG. 3 is an enlarged plan view of part of the disk drive apparatus of FIG. 1.
Figure 4:
FIG. 4 is a section taken along the line IV—IV of FIG. 3.

FIGS. 3 and 4 illustrate the washer 32 used when the magnetic disk 30 are fixedly mounted on the hub 16. FIG. 3 is a plan view of the washer 32. FIG. 4 is an end view taken along the line IV—IV of FIG. 3. As shown in FIGS. 3 and 4, the washer 32 has three inner protrusions 36 on the inner peripheral portion thereof. These inner protrusions 36 are engaged with recesses 38 provided in the externally threaded portion 97 of the proximal end portion 98 of the hub 16, and prevent the washer 34 from being rotated together with with the clamping member 34 when the clamping member 34 is threaded on the externally threaded portion 97 of the hub 16. The disk 30 is fixed to the hub over the entire inner peripheral portion thereof through the coned disc spring-like washer 32 therebetween. At that time, since a substantially uniform gripping force is exerted to the magnetic disk 30 over the substantially entire inner peripheral portion thereof, the warpage or distortion of the disc can be prevented while damage to the fixed disk 30 and generation of dust can be prevented.

Figure 5:
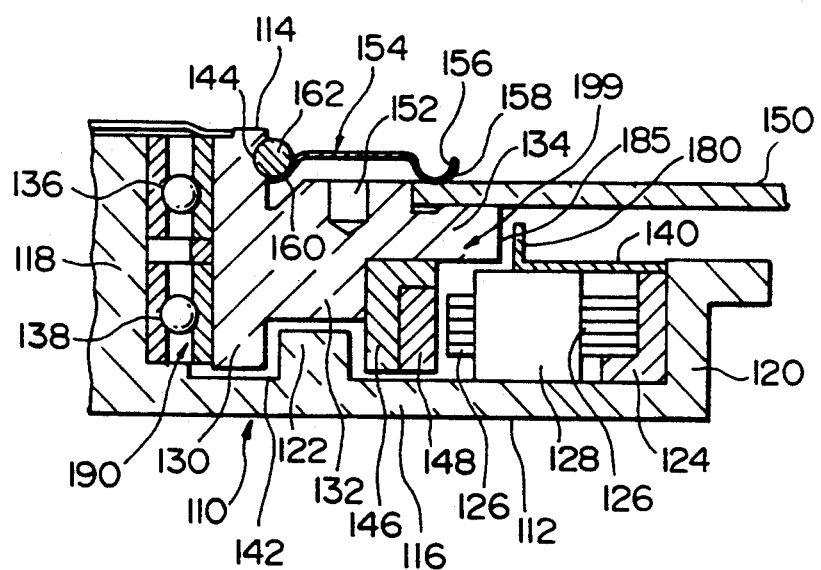
FIG. 5 is a sectional view of part of a second embodiment of the disk drive apparatus according to the present invention.
Figure 6:
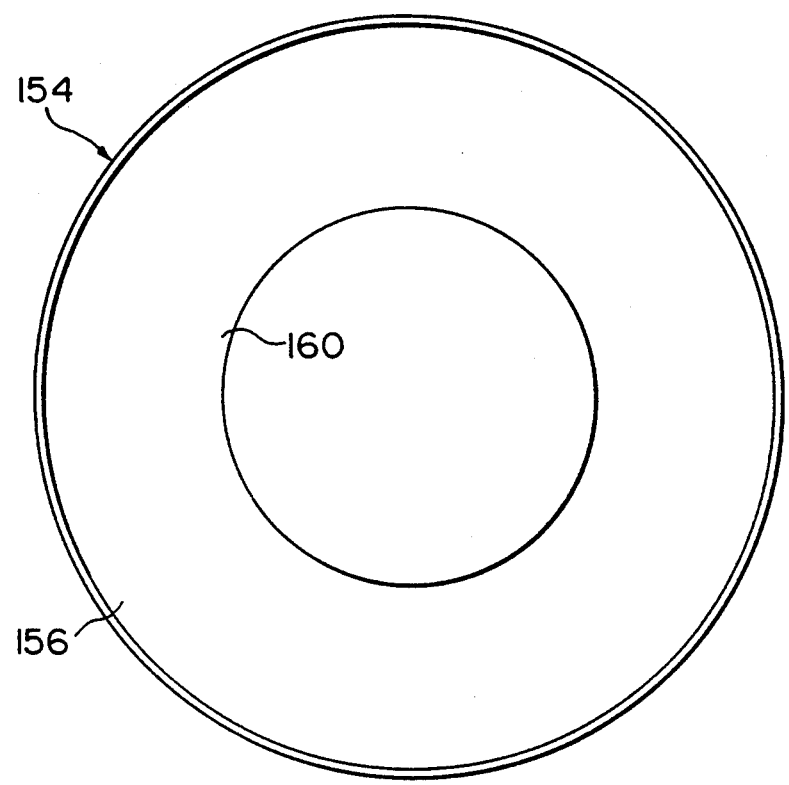
FIG. 6 is an enlarged plan view of part of the disk drive apparatus of FIG. 5.
Figure 7:
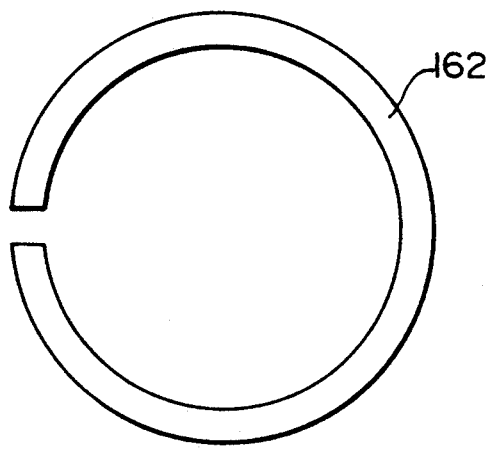
FIG. 7 is an enlarged plan view of an elastic annular member of the disk drive apparatus of FIG. 5.

A second embodiment of the disk drive apparatus according to the present invention will be described below with reference to FIGS. 5 through 7. FIG. 5 is a sectional view of part of the second embodiment of the disk drive apparatus, mainly illustrating the right half portion thereof where the spindle motor for driving the disk is provided. FIG. 6 is a plan view of a clamping member. FIG. 7 is a plan view of a C-shaped ring.

In FIG. 5, a spindle motor 110 is mounted on a housing 112 of the disk drive apparatus, as in the case of the first embodiment. A support pole 118 is formed integrally with the housing 112 at the central portion of a bottom portion 116 thereof. A peripheral wall 120 is formed integrally with the housing 112 at the outer peripheral portion of the bottom portion 116. An annular protruding portion 122 is formed on the upper surface of the bottom portion 116 between the support pole 118 and the peripheral wall 120.

A hub 114 on which a magnetic disk 150 is mounted has a hole portion 190. The hub 114 has an inner peripheral cylindrical portion 130, an intermediate portion 132 located on the outer side of the inner peripheral cylindrical portion 130 in the radial direction, and an outer peripheral extending portion 134 located on the outermost portion. These components of the hub 114 are formed as one unit. Ball bearings 136 and 138 are mounted on the inner side of the inner peripheral cylindrical portion 130 of the hub 114. The hub 114 is mounted on the support pole 118 of the housing 112 with the ball bearings 136 and 138 therebetween. Thus, the hub 114 is rotatable with respect to the support pole 118 of the housing 112. The hub 114 of the disk drive apparatus according to the second embodiment has no rotary shaft, unlike the first embodiment, and is rotatably supported by the support pole 118 of the housing 112.

An annular rotor yoke 146 having substantially L-shaped cross-section is fixed to the undersurface of the outer peripheral extending portion 134 located on the outer side of the intermediate portion 132 in the radial direction, and a cylindrical rotor magnet 148 is mounted on the outer periphery of the annular rotor yoke 146. The rotor magnet 148 has a predetermined number of N and S poles alternately disposed in the circumferential direction thereof. The hub 114 and the rotor magnet 148 in combination form a rotor 199. A stator core 126 is disposed on the outer side of the rotor magnet 148 with a gap therebetween in such a manner that it opposes the rotor magnet 148. The lower end portion of the inner peripheral cylindrical portion 130 of the hub 114 is accommodated in a groove portion 142 formed between the support pole 118 and the annular protruding portion 122. An annular groove 144 is provided on the outer peripheral portion of the upper end portion of the inner peripheral cylindrical portion 130. The annular groove 144 is opened outwardly in the radial direction.

A member 124 is an annular stator yoke having an L-shaped cross-section. The annular stator yoke 124 is fixed to the inner side of the peripheral wall 120. A stator yoke 126 is fixed to the inner peripheral side of the annular stator yoke 124. A member 128 is a stator coil wound around the stator core 126. Thus, the spindle motor 110 in the disk drive apparatus according to the second embodiment is an inner rotor type motor in which the rotor 199 is located on the inner side of the stator core 126 in the radial direction, as in the case of the first embodiment.

A combination of the lower end surface of the inner peripheral cylindrical portion 130 of the hub 114 and the groove portion 142 of the housing 112 form a labyrinth sealing structure. Similarly, a combination of the annular protruding portion 122 and the annular rotor yoke 146 and rotor magnet 148 form a Labyrinth sealing structure. Consequently, leakage of the fine oil particles or dirt from the interior of the spindle motor 110 to, for example, into the disk chamber is prevented.

An annular magnetic shielding plate 140 covers the upper surface of the stator coil 128, the stator core 126 and annular stator yoke 124 which are located on the outer side of the outer peripheral extending portion 134 of the hub 114. Therefore, the magnetic shielding plate 140 has the function of preventing the magnetic disk 150 from being affected by the leakage flux generated from the stator core 126 and the rotor magnet 148. Also, an annular wall portion 180 of the magnetic shielding plate 140 is disposed in such a manner that it opposes an outer peripheral end surface 185 of the outer peripheral extending portion 134 with a small gap therebetween. Thus, the labyrinth sealing effect is further enhanced.

The disk 150 is mounted on the upper surface of the outer peripheral extending portion 134 (whose upper surface serves as a disk mounting surface) of the hub 114. A rotation-preventing hole 152 prevents rotation of the hub 114 when the disk 150 is fixed thereto.

A clamping member 154, which is an annular plate made of phosphor bronze, is mounted on the hub 114. The outer peripheral portion of the clamping member 154 forms a semi-circular circular curved portion 156 which is curved in a downward direction as viewed in FIG. 5. The undersurface of the semi-circular curved portion 156 forms an annular curved surface 158 which makes contact with the surface of the disk 150. The inner peripheral portion of the clamping member 154 forms an arc-shaped curved portion 160 which is curved in a downward direction. An annular recess defined by the curved portion 160 defines a mounting groove in cooperation with the annular groove 144. A C-shaped, partially cut metal ring 162 (an annular elastic member) is mounted in the mounting groove. The C-shaped ring 162 is designed to be slightly elastically deformed when pulled in two directions. The clamping member 154 is fitted to the upper end portion of the inner peripheral cylindrical portion 130, and the C-shaped ring 162 is elastically fitted into the mounting groove 144. Consequently, the curved portion 160 of the clamping member 154 is pressed in a downward direction as viewed in FIG. 5. As a result, the surface of the magnetic disk 150 is pressed by the annular curved surface 158 of the clamping member 154, and the disk 150 is thereby elastically retained between the extending portion 134 of the hub 114 and the curved portion 156 of the clamping member 154.

In the disk drive apparatus according to the second embodiment of the present invention, the axial force applied to the ball bearings 136 and 138 of the spindle motor 110 when the C-shaped ring 162 is fitted into the annular groove 144 is very low. Furthermore, the pressing force applied to the magnetic disk 150 is not imbalanced in the circumferential direction thereof. Furthermore, since the annular curved surface 158 presses the disk 150, when the disk 150 is fixed or when the spindle motor 110 is rotated, generation of the dust due to wear of the disk 150 is prevented.

The aforementioned disk drive apparatus according to the second embodiment has the following advantages. Since the disk 150 can be elastically held by the clamping member 154 pressed by the elastic annular member 162 by elastically fitting the elastic annular member 162, as compared with the case in which the disk 150 is fixedly retained by a clamping member 154 screwed to the rotary portion, damage to the bearing member (136, 138) or generation of non-repetitious deflection, vibrations or noises due to application of imbalanced force to the bearing member can be prevented.

In order to reliably avoid the damage to the hard disk 150, it is desirable that the annular curved surface 158 be subjected to the wear-resistant coating. Furthermore, the elastic annular member 162 is not limited to the aforementioned C-shaped ring but other elastically fitted members, such as an O-ring made of rubber, can be used as the elastic annular member 162.

What is claimed is:

1. A disk drive apparatus including a magnetic disk on which data is recorded, a spindle motor for rotating the magnetic disk in a predetermined direction, a magnetic head for writing data on and/or reading out data from the magnetic disk, a support arm for supporting said magnetic head, and a voice coil motor for pivoting said support arm and thereby moving said magnetic head in a radial direction of the magnetic disk, said spindle motor having a hub on which the magnetic disk is mounted, a rotor magnet mounted on said hub, and a stator disposed opposite to said rotor magnet, the improvement being characterized in that said stator includes a stator core having an annular proximal end portion disposed on an outer side of said rotor magnet, a plurality of coil winding portions extending from said annular proximal end portion, and stator teeth portions each of which is provided on a free end portion of each of the plurality of coil winding portions, in that an armature coil is wound around each of said plurality of coil winding portions, and in that said stator teeth portions are disposed substantially equiangularly in a circumferential direction while at least part of said plurality of coil winding portions are disposed non-uniformly in the circumferential direction, whereby the armature coils wound around said plurality of coil winding portions are retracted from a path in which said support arm is moved.

2. A disk drive apparatus according to claim 1, wherein the at least part of said plurality of coil winding portions extend in such a manner that it deviates in a radial direction while the remaining of said plurality of coil winding portions extend substantially on a straight line in the radial direction.

3. A disk drive apparatus according to claim 1, wherein the length of each of said stator teeth portions in the circumferential direction is substantially the same.

4. A disk drive apparatus according to claim 1, wherein the stator teeth portions and the corresponding coil winding portions of said stator are curved in a downward directio, said stator teeth portions being mounted on a housing of said apparatus.

5. A disk drive apparatus according to claim 4, wherein said housing has a recessed portion at a position corresponding to the armature coil wound around each of said plurality of coil winding portions, part of the armature coils being accommodated in the corresponding recessed portions.

6. A disk drive apparatus according to claim 1, further comprising a magnetic shielding member which is disposed between the magnetic disk and said stator core in such a manner that it covers said stator.

7. A disk drive apparatus according to claim 1, wherein said stator core has an extending portion which extends toward said voice coil motor, part of said extending portion functioning as a yoke of said voice coil motor.

8. A disk drive apparatus including a magnetic disk on which data is recorded, a spindle motor for rotating the magnetic disk in a predetermined direction, a magnetic head for writing data on and/or reading out data from the magnetic disk, a support arm for supporting said magnetic head, and a voice coil motor for pivoting said support arm and thereby moving said magnetic head in a radial direction of the magnetic disk, said spindle motor having a hub on which the magnetic disk is mounted, a rotor magnet mounted on said hub, and a stator disposed opposite to said rotor magnet, the improvement being characterized in that said stator has a stator core around which an armature coil is wound, said stator core having an extending portion which extends toward said voice coil motor, part of said extending portion functioning as a yoke of said voice coil motor.

* * * * *